United States Patent [19]

McKenzie

[11] Patent Number: 5,468,383
[45] Date of Patent: Nov. 21, 1995

[54] FLUID FILTER HOLDER

[76] Inventor: Thomas J. McKenzie, 6230 N. Camino Pimera Alta, Tucson, Ariz. 85718

[21] Appl. No.: 202,429

[22] Filed: Feb. 28, 1994

[51] Int. Cl.⁶ .......................... B01D 35/00; B01D 35/02
[52] U.S. Cl. .............. 210/232; 55/492; 55/507; 55/508; 210/485; 267/167; 267/168; 267/178; 267/180
[58] Field of Search .................... 210/232, 356, 210/483, 487, 485; 239/462; 267/166, 167, 168, 178, 180; 55/492, 507, 508

[56] References Cited

U.S. PATENT DOCUMENTS

| 162,294 | 4/1875 | Leiner | 210/485 |
|---|---|---|---|
| 524,168 | 8/1894 | Galster | 210/483 |
| 991,872 | 5/1911 | Meyer | 210/459 |
| 3,744,222 | 7/1973 | Delao | 55/446 |
| 3,960,733 | 6/1976 | Van Dieren | 210/485 |
| 4,094,787 | 6/1978 | Giordano | 210/103 |
| 4,539,116 | 9/1985 | Morin | 210/445 |
| 4,559,140 | 12/1985 | Croteau | 210/497.2 |
| 5,064,533 | 11/1991 | Anson | 210/232 |
| 5,186,828 | 2/1993 | Mankia | 210/232 |
| 5,234,592 | 8/1993 | Schneider | 210/440 |
| 5,252,210 | 10/1993 | Kessel | 210/452 |

OTHER PUBLICATIONS

Brochure Listing Accessories from Airlessco, Moorpark, Calif. (undated).

Primary Examiner—John Kim
Attorney, Agent, or Firm—H. Walter Clum

[57] ABSTRACT

This invention is a device for holding a flexible fine mesh fluid filter 30 in a container 12 while a fluid, such as paint, is being drawn from the container by spraying equipment 8. More specifically, the invention comprises a ring of flexible material 20 and a purality, preferably two, of elongate flexible members 18, ends of which are secured to the flexible ring, with their intermediate parts depending from the said ring, and secured together where they cross at their intermediate depending portions, and together with the flexible ring, forming a pocket over which a fine mesh fabric fluid filter is to be positioned and held. When so assembled in use the suction pipe of the spraying equipment with its filter is received within the pocket and held in the container to filter the paint, or other fluids as it is drawn from the container. In the best and preferred form of the invention, all of the parts above mentioned are in the form of coil springs, but it should not be considered so limited thereto.

9 Claims, 2 Drawing Sheets

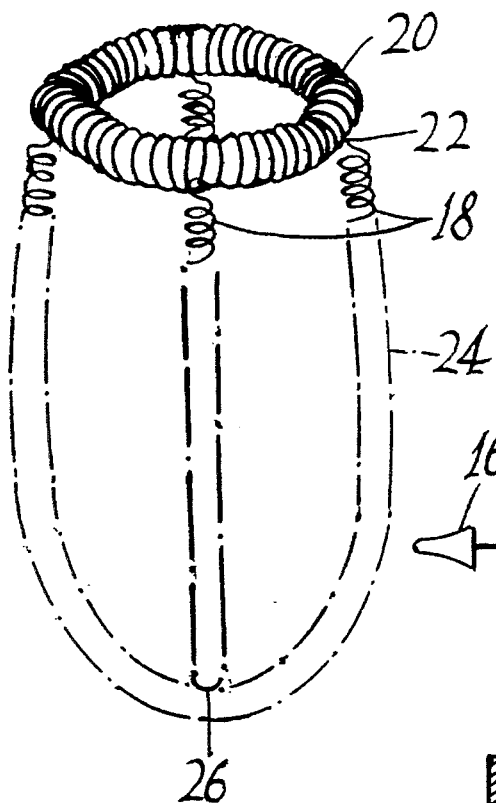
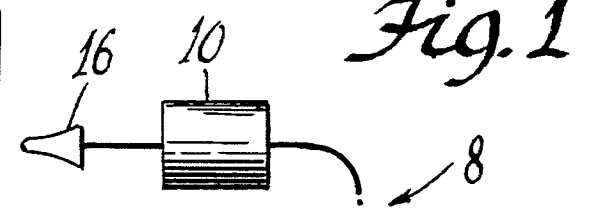
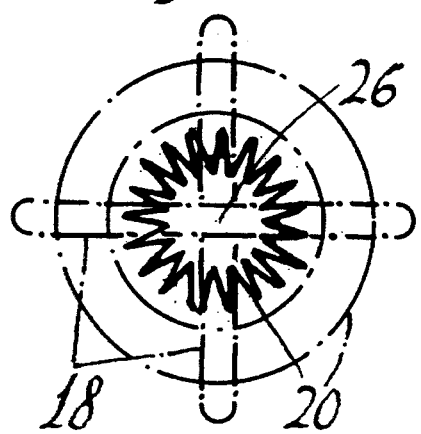
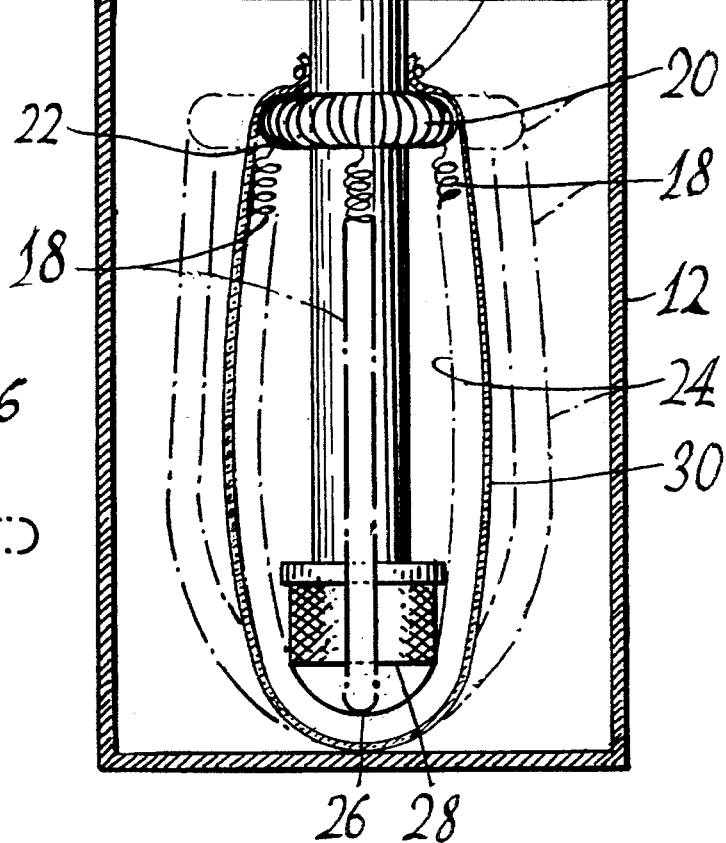

5,468,383

FLUID FILTER HOLDER

FIELD OF THE INVENTION

The invention primarily, but not exclusively, relates to the field of professional spraying of fluids, but more particularly to that portion of this art which involves the spraying of a fluid, such as paint, by means of power equipment.

BACKGROUND

Normally the professional spraying of fluids, such as paint, includes motorized spray equipment which includes a pump for drawing paint through a pipe directly from a container, such as a bucket, and spraying the paint through a spray head, such as a nozzle, having a very small opening of such as eleven thousandth of an inch (0.011), through which the paint is sprayed upon whatever it is to be received. The opposite end of the pipe usually is provided with a rather small coarse wire mesh filter for removing unwanted particles, impediments, in the paint to prevent the nozzle from becoming clogged.

However, in use it usually isn't long before these filters become clogged themselves or, on the other hand, permit enough of the particle impediments to find there way through the pipe and clog the nozzle, requiring a shut down of the spraying equipment to clean the nozzle, in either case resulting in some undesirable lost time on the job.

In the past some efforts have been made to prevent this clogging of the spraying equipment, such as first pouring the paint into containers through a large fine mesh fabric filter, but this takes an unduly long time, resulting in lost time on the job. Other efforts, as shown in the prior art found during a pre-ex search at the Patent and Trademark Office, include improving or enlarging the metal filter normally provided at the container end of the pipe through which the paint is drawn from the container, but these efforts have been directed toward improving or enlarging that filter. All of these former attempts have either been of time delaying methods or of complicated expensive construction, and none have satisfied the demand for a successful and economical method for keeping the spray nozzle clear until the job is completed.

SUMMARY OF THE INVENTION

The object of the present invention is to provide an unbelievable simple and inexpensive device for holding a flexible fine mesh fabric filter, usually of Nylon, over the end of the spraying equipment suction pipe and the coarse wire mesh filter normally located there, when they are positioned at the bottom of the container, thus permitting the paint, or other fluids, to be successfully filtered, first through the Nylon filter and then through the filter normally provided at and on the end of the spray equipment pipe, as it is drawn from the container to be sprayed from the associated nozzle without ever clogging the nozzle, thus permitting the spraying job to be completed without the delays formerly associated with professional spraying equipment. The invention is of such inexpensive construction that it might be more practical just to throw it away after the job is completed rather than bothering to take the time and expense to clean it up.

BRIEF DESCRIPTION OF THE DRAWINGS

FIG. 1 is a partially diagrammatic and partially sectional elevational view showing the invention as it would be associated with paint or other fluid spraying equipment;

FIG. 2 is a perspective view of the preferred and best form of the invention, showing its open condition for receiving the suction pipe and filter of spraying equipment;

FIG. 3 is a partially diagrammatic top plan view of the invention seen in FIG. 2; shown in its closed condition in full lines and its open condition in broken lines;

DETAILED DESCRIPTION OF THE INVENTION IN ITS BEST FORM

Figure 4:
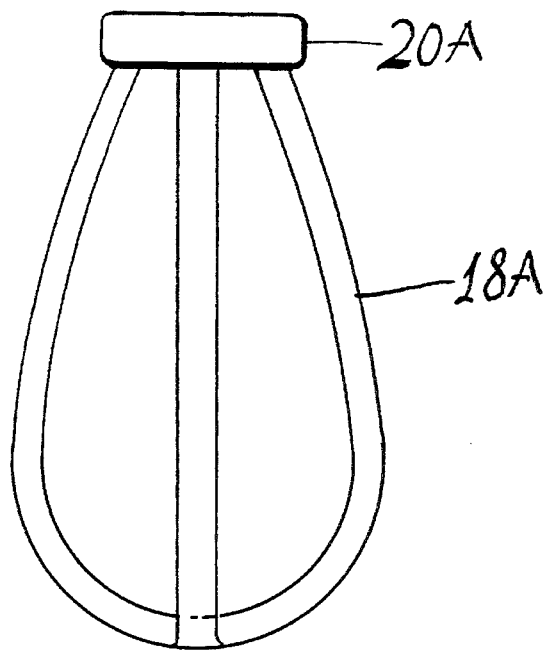
FIGS. 4, 5 and 6 are elevational views of several modified forms of the invention.

Referring first to FIG. 1, the invention is shown as it would be employed when, by way of example, spraying paint by means of the equipment designated generally by the reference character 8, and which includes a pump 10 for drawing paint from bucket 12 through pipe 14 to be sprayed from the spray head or nozzle 16.

Basically this important filter holder invention is of very simple and inexpensive construction, comprising in this, its best and preferred form, three coil springs, two of which are identified by the same reference character 18. Preferably these two springs are of smaller diameter than the larger third ring like spring 20, and have their opposite ends 22 secured at diametrically opposed positions to the larger spring 20, as seen in FIGS. 1 and 2. The portions 24 intermediate the ends 22 of springs 18 descend in loops from spring 20 and are secured together where they cross, thus to form the bottom 26 of the holder. In its at rest or unflexed condition, the inner diameter of spring 20 is substantially the same as the outer diameter of the pipe 14, it being understood that both dimensions may vary according to the spraying equipment being used.

Omitting the specific dimensions of this best form of the invention as being unnecessary to a clear understanding thereof, the description in the immediately above paragraph describes the complete invention in its best and preferred form as it will be used in paint spraying equipment. However, the following description of its use will present a complete understanding of its important contribution in the paint spraying art.

Turning back to FIG. 1 which illustrates how the invention will be employed in a professional paint spraying system, it can be seen that the paint inlet at the bottom of suction pipe 14 normally is provided with a coarse mesh metal filter 28 which is ineffective to filter all the clogging particles normally found in paint when first purchased from suppliers. In the past a great deal of effort has been expended to overcome this difficulty, but all have been either time consuming or expensive.

The present invention provides a filter holder, both simple in construction and inexpensive which successfully overcomes the clogging problem heretofore encountered in spray painting equipment.

This is accomplished simply by manually taking hold of opposite sides of spring 20 and expanding it sufficiently, as seen in FIGS. 1 and 2, to permit pipe 14 with its filter 28 to be inserted through the now expanded open center of ring spring 20 into the holder pocket formed with it by springs 18 until it bottoms on the downwardly looped springs 18 where they are secured together at 26. This is clearly seen in FIG.

1 which shows filter 28 spaced away from the bottom of the bucket 12 containing the paint to be sprayed, thus clearing this filter 28 to receive paint after passing through filter 30. Coil spring ring 20 then is released to spring back to its normal condition around pipe 14, preferably in sliding relation therewith.

Actually before the filter holder of the present invention is placed in the bucket of paint, a very fine mesh fabric filter 30 (usually of Nylon) is slipped over the holder and tightly expanded to its fully open condition by springs 18. This prevents any portion of filter 30 being sucked into contact with pipe filter 28 to obstruct the full flow of paint both through itself and into into pipe 14.

After filter 30 is fully positioned over springs 18 and 20, its open top is drawn closed, gathered and tied around pipe 14 immediately above spring 20, as seen at 32 in FIG. 1. Now the spraying equipment 8 may be started to effect a free flow of particle clear paint directly from bucket 12. At first the paint will start its flow through filter 28 into pipe 14, but continuing flow will be filtered first through the fine mesh fabric filter 30, and then through springs 18 which are formed of open windings to permit paint freely to flow through these springs, and finally throughout the whole assembly into pipe 14.

It may now be clearly understood that the present filter holder invention provides a filter system adaptable and useful in most existing professional paint, or other fluid, spraying equipment currently in use, and one which fully satisfies the objects and purposes of the invention.

Figure 5:
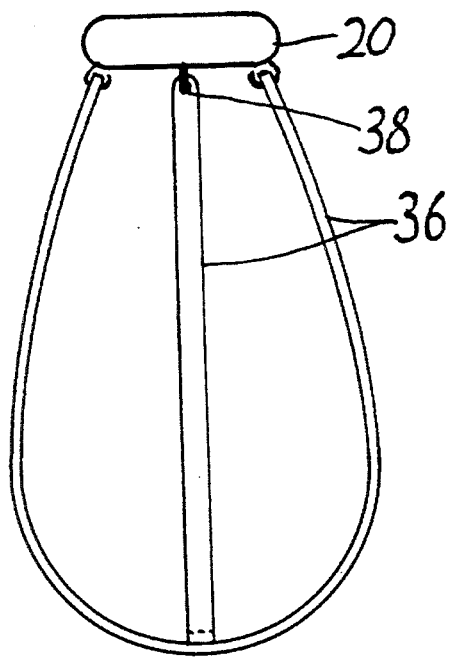
Figure 6:
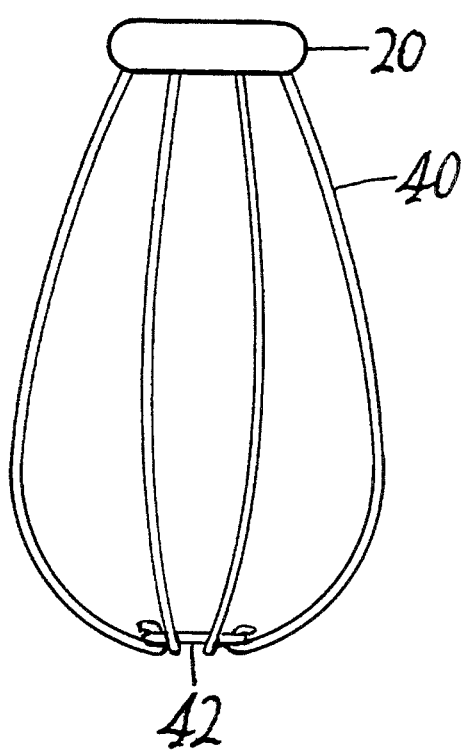

Other forms of the invention are illustrated in FIGS. 4, 5 and 6. In the form shown in FIG. 4 all the springs of the best form are replaced by some satisfactory flexible material, such as rubber of a type which would have sufficient resistence to flexing as to retain its shape during use, but flexible enough to be expanded open to permit pipe 14 with its filter 28 to be inserted within the modified holder. The corresponding parts in this figure are 20A for the spring 20, and 18A for springs 18, both in FIG. 1.

In the modification illustrated in FIG. 5, springs 18 of the preferred best form of the invention have been replaced with flexible metal straps, or bands, 36 having small holes 38 in their ends, whereby they may be tied by wire, or some other suitable means, to the ring spring 20.

In FIG. 6 springs 18 have been replaced with a plurality of single strand wires 40. These wires have their lower ends secured to a wire ring 42 and their upper ends secured to coil spring 20.

REFERENCE CHARACTERS

| | |
|---|---|
| 8 | SPRAY EQUIPMENT |
| 10 | PUMP |
| 12 | BUCKET OR CONTAINER |
| 14 | SUCTION PIPE OF SPRAYING EQUIPMENT |
| 16 | SPRAYING NOZZLE |
| 18 | SMALL SPRINGS |
| 18A | RUBBER-LIKE ELEMENTS IN FIG. 4 REPLACING SPRINGS 18 IN FIG. 1 |
| 20 | LARGE RING SPRING |
| 20A | RUBBER-LIKE RING IN FIG. 4 REPLACING SPRING 20 IN FIG. 1 |
| 22 | WHERE TOPS OF SPRINGS 18 ARE CONNECTED TO SPRING 20 |
| 24 | INTERMEDIATE PORTIONS OF SPRING 18 |
| 26 | BOTTOM OF HOLDER WHERE SPRINGS 18 CROSS |
| 28 | METAL FILTER SECURED TO BOTTOM OF PIPE 14 |
| 30 | NYLON FILTER HUGGING THE OUTSIDE OF SPRINGS 18 |
| 32 | WHERE NYLON FILTER 30 IS TIED AGAINST PIPE 14 |
| 34 | NOT USED |
| 36 | FLEXIBLE STRAPS, OR BANDS, IN FIG. 5 |
| 38 | SMALL HOLES AT ENDS OF STRAPS 36 FOR ATTACHING TO SPRING 20 |
| 40 | SINGLE STRAND WIRES OF FIG. 6 |
| 42 | WIRE RING TO WHICH WIRES 40 ARE ATTACHED AT THEIR LOWER ENDS |

What is claimed is:

1. A fluid filter holder for use with fluid spraying equipment comprising a suction pipe connected through a pump to a fluid spraying nozzle:

said fluid filter holder comprising:
- (a) a ring member of semi-rigid flexible and expandable material for flexible attachment to and closely surrounding the end of said suction pipe; and
- (b) a plurality of thin loops of flexible and expandable material, said loops having ends secured to said ring member around the periphery of said ring member with their intermediate portions extending away from said ring member and secured together where they cross, thus to form the bottom of said filter holder.

2. A fluid filter holder according to claim 1 wherein:
- (a) said ring member; and
- (b) said loops are formed of flexible rubber whereby the ring member may be expanded.

3. A fluid filter holder for use with fluid spraying equipment, including a suction pipe connected through a pump to a fluid spraying nozzle, said fluid filter holder comprising:
- (a) a coil spring ring formed in a closed circular flexible and expandable ring open at the center thereof for flexible fitting over and tight securement to the end of said suction pipe; and
- (b) a plurality of flexible coil springs with their ends secured to said coil spring ring at opposite sides of said coil spring ring and with their intermediate portions extending away from said coil spring ring in loops secured together where the loops cross each other thus to form the bottom of said fluid filter holder.

4. A fluid filter holder according to claim 3 wherein:
said coil springs in loops are formed with open windings thus to permit fluid to flow therethrough.

5. A fluid filter holder according to claim 3 wherein: said coil springs in loops are of smaller diameter than said coil spring ring.

6. A fluid filter holder according to claim 3 wherein: there are at least two of said coil springs in loops.

7. A filter holder for use upon a suction pipe and filter of paint spraying equipment comprising a suction pipe and filter connected through a pump to a fluid spraying nozzle:

(a) a coil spring formed in a closed circular flexible and expandable ring; and (b) open spring means attached to and depending in loops from said ring and forming therewith an open pocket over which a filter can be positioned and supported around but spaced from the end of said pipe and filter of said spraying equipment during spraying of said paint.

8. A fluid filter holder according to claim 7 wherein:
said loops are formed of single strand flexible wires.

9. A fluid filter holder according to claim 7 wherein:
said loops are formed of thin flexible straps.

* * * * *